US 9,749,443 B2

(12) United States Patent
Barrett et al.

(10) Patent No.: US 9,749,443 B2
(45) Date of Patent: Aug. 29, 2017

(54) SYSTEM AND METHOD FOR VIDEO DISTRIBUTION OVER INTERNET PROTOCOL NETWORKS

(75) Inventors: Timothy Alan Barrett, Pymble (AU); Ben Crosby, Murphy, TX (US)

(73) Assignee: THOMSON LICENSING, Issy les Moulineaux (FR)

(*) Notice: Subject to any disclaimer, the term of this patent is extended or adjusted under 35 U.S.C. 154(b) by 333 days.

(21) Appl. No.: 13/978,164

(22) PCT Filed: Feb. 3, 2011

(86) PCT No.: PCT/US2011/023562
§ 371 (c)(1),
(2), (4) Date: Jul. 3, 2013

(87) PCT Pub. No.: WO2012/094032
PCT Pub. Date: Jul. 12, 2012

(65) Prior Publication Data
US 2013/0282801 A1    Oct. 24, 2013

Related U.S. Application Data

(60) Provisional application No. 61/429,901, filed on Jan. 5, 2011.

(51) Int. Cl.
*G06F 15/16* (2006.01)
*H04L 29/06* (2006.01)
(Continued)

(52) U.S. Cl.
CPC ............. *H04L 67/42* (2013.01); *H04N 5/765* (2013.01); *H04N 21/43615* (2013.01)

(58) Field of Classification Search
CPC ............ H04L 65/4076; H04L 65/4084; H04N 21/43615; H04N 21/4383; H04N 21/6587; H04N 5/4403
See application file for complete search history.

(56) References Cited

U.S. PATENT DOCUMENTS 6,963,590 B1 * 11/2005 Mann et al. .................. 370/535
7,222,185 B1 *  5/2007 Day .............................. 709/232
(Continued)

FOREIGN PATENT DOCUMENTS

CN      1520545      8/2004
CN    101310532     11/2008
(Continued)

OTHER PUBLICATIONS

Hu Jia Zhang Qi, "Research on the Implementation of Secure UPNP Architecture," 2009 2nd IEEE International Conference on Broadband Network, Oct. 18-20, 2009.
(Continued)

*Primary Examiner* — Shean Tokuta
(74) *Attorney, Agent, or Firm* — Brian J. Dorini; Michael A. Pugel; Ivonete Markman

(57) ABSTRACT

A system and method for system and method for video distribution over a range of devices over Internet Protocol (IP) networks are provided. The system and method provide for connecting to the network at least one additional content source, communicating a first request over the network, the request requiring each of the plurality of content sources to identify channels on which each of the content sources provides content, and selecting a channel not being used by the content sources to provide content. The method and system may also provide for connecting at least one client to the network, communicating a second request over the network, the second request requiring each of the plurality of content sources to identify channels on which each of the plurality of content sources provides content, selecting an identified channel by the at least one client, and providing content to the at least one client on the selected identified channel.

40 Claims, 7 Drawing Sheets

(51) Int. Cl.
*H04N 5/765* (2006.01)
*H04N 21/436* (2011.01)

(56) References Cited

U.S. PATENT DOCUMENTS

| | | | |
|---|---|---|---|
| 7,617,326 B2 | 11/2009 | Gervais et al. | |
| 8,050,289 B1* | 11/2011 | Masterson et al. | 370/465 |
| 8,379,156 B2 | 2/2013 | Nakamura et al. | |
| 8,516,081 B2 | 8/2013 | Kunito et al. | |
| 2003/0001898 A1 | 1/2003 | Bernhardson | |
| 2004/0073610 A1 | 4/2004 | Terada et al. | |
| 2005/0010963 A1* | 1/2005 | Zeng et al. | 725/131 |
| 2005/0132191 A1 | 6/2005 | Joshi et al. | |
| 2005/0262082 A1 | 11/2005 | Kushalnagar et al. | |
| 2006/0085822 A1 | 4/2006 | Chang et al. | |
| 2006/0095401 A1* | 5/2006 | Krikorian et al. | 707/1 |
| 2006/0171262 A1 | 8/2006 | Han | |
| 2006/0294573 A1* | 12/2006 | Rogers et al. | 725/147 |
| 2007/0250870 A1* | 10/2007 | Kim et al. | 725/81 |
| 2007/0276866 A1 | 11/2007 | Bodin et al. | |
| 2008/0077483 A1* | 3/2008 | Hollo et al. | 705/14 |
| 2009/0327507 A1 | 12/2009 | Douillet et al. | |
| 2010/0070603 A1* | 3/2010 | Moss et al. | 709/207 |
| 2010/0199312 A1* | 8/2010 | Chang et al. | 725/46 |
| 2010/0223407 A1* | 9/2010 | Dong et al. | 710/70 |
| 2010/0263010 A1 | 10/2010 | Kim | |
| 2011/0173304 A1* | 7/2011 | Schlack et al. | 709/220 |
| 2012/0090013 A1* | 4/2012 | Zhou et al. | 725/95 |

FOREIGN PATENT DOCUMENTS

| | | |
|---|---|---|
| EP | 1686808 | 8/2006 |
| JP | 2004128597 | 4/2004 |
| JP | 2005123884 | 5/2005 |
| JP | 2006113735 | 4/2006 |
| JP | 2006115450 | 4/2006 |
| JP | 2006211539 | 8/2006 |
| JP | 2006261784 | 9/2006 |
| JP | 2006333415 | 12/2006 |
| JP | 2010118878 | 5/2010 |
| JP | 2010154349 | 7/2010 |
| JP | 2010245654 | 10/2010 |
| JP | 2010252323 | 11/2010 |
| KR | 2005015528 | 8/2003 |
| KR | 1020050120648 | 12/2005 |
| KR | 1020060087318 A | 8/2006 |
| WO | WO2007047410 | 4/2007 |

OTHER PUBLICATIONS

International Search Report dated Oct. 27, 2011.

* cited by examiner

Simple AV Server Device Back Panel

Complex AV Server Device Back Panel with Varied Inputs

SYSTEM AND METHOD FOR VIDEO DISTRIBUTION OVER INTERNET PROTOCOL NETWORKS

REFERENCE TO RELATED PROVISIONAL APPLICATION

This application claims the benefit, under 35 U.S.C. §365 of International Application PCT/US2011/023562, filed Feb. 3, 2011, which was published in accordance with PCT Article 21(2) on Jul. 12, 2012 in English and which claims the benefit of U.S. provisional patent application No. 61/429,901, filed Jan. 5, 2011.

TECHNICAL FIELD OF THE INVENTION

The present disclosure generally relates to digital content systems and methods for distributing content, and more particularly, to a system and method for audio/video distribution between a number of devices over Internet Protocol (IP) networks.

BACKGROUND OF THE INVENTION

With the proliferation of media devices in the home, there is a growing requirement to have high quality audio/video (AV) signals sourced in one location, made available simply and easily in other locations in the home. Conventionally, disparate content sources may reside in a home where content is viewable or playable in only one location. Referring to FIG. 1, a conventional scenario for home media connectivity 10 is illustrated. Here, a first television or display device 12 may be coupled to an audio/video (AV) receiver 14 which is further coupled to a plurality of content sources, e.g., a DVD player 16, a set-top box 18 and/or a digital video recorder (DVR) 20. A second television 22 is coupled to an Internet Protocol (IP) media player 24, which is further coupled to an Ethernet switch 26 that provides access to a Network-Attached Storage (NAS)/Media Server 28. Lastly, a third television 30 is directly coupled to a digital video disc (DVD) player 32. Although all the devices shown in FIG. 1 may be in a single home, each television or display device 12, 22 30 typically only has access to content on devices directly coupled to that particular television or display device 12, 22 30. For example, television 12 can access content from DVD player 16, set-top box 18 and DVR 20 but can not access content from NAS/Media Server 28 or DVD player 32. Similarly, television 30 can only access content from DVD player 32.

There are several mechanisms known for distributing video around the home. In addition to the many standard definition wireless solutions, solutions such as wireless High-Definition Multimedia Interface (HDMI) are starting to emerge for High Definition (HD), though these have limited range. As a wired solution for HD video, using Category 5 Ethernet (Cat5e) cable for Base-Band HDMI video transmission is another possible solution. Several companies, however, also provide IP based media distribution systems. These IP solutions have the advantage over Base Band solutions that do not provide mechanisms to traverse traditional Ethernet infrastructure and are only designed to be point to point. Wireless HDMI solutions require a dedicated infrastructure that essentially replaces the point to point cable with wireless links.

Given the rapid expansion of Ethernet or more broadly IP connectivity in the home, and a rapid expansion in the number of both video sources and displays in the home, a need exists for techniques for simply and effectively delivering audio and video information between multiple points in the home, over unmanaged (and uncontrolled) IP infrastructure.

SUMMARY

A system and method for audio/video (AV) distribution between a range of devices over Internet Protocol (IP) networks are provided.

According to one aspect of the present disclosure, a system and method for system and method for video distribution over a range of devices over Internet Protocol (IP) networks are provided. The system and method are directed towards connecting to the network at least one additional content source, communicating a first request over the network, the request requiring each of the plurality of content sources to identify channels on which each of the content sources provides content, and selecting a channel not being used by the content sources to provide content. The method and system may also be directed towards connecting at least one client to the network, communicating a second request over the network, the second request requiring each of the plurality of content sources to identify channels on which each of the plurality of content sources provides content, selecting an identified channel by the at least one client, and providing content to the at least one client on the selected identified channel.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
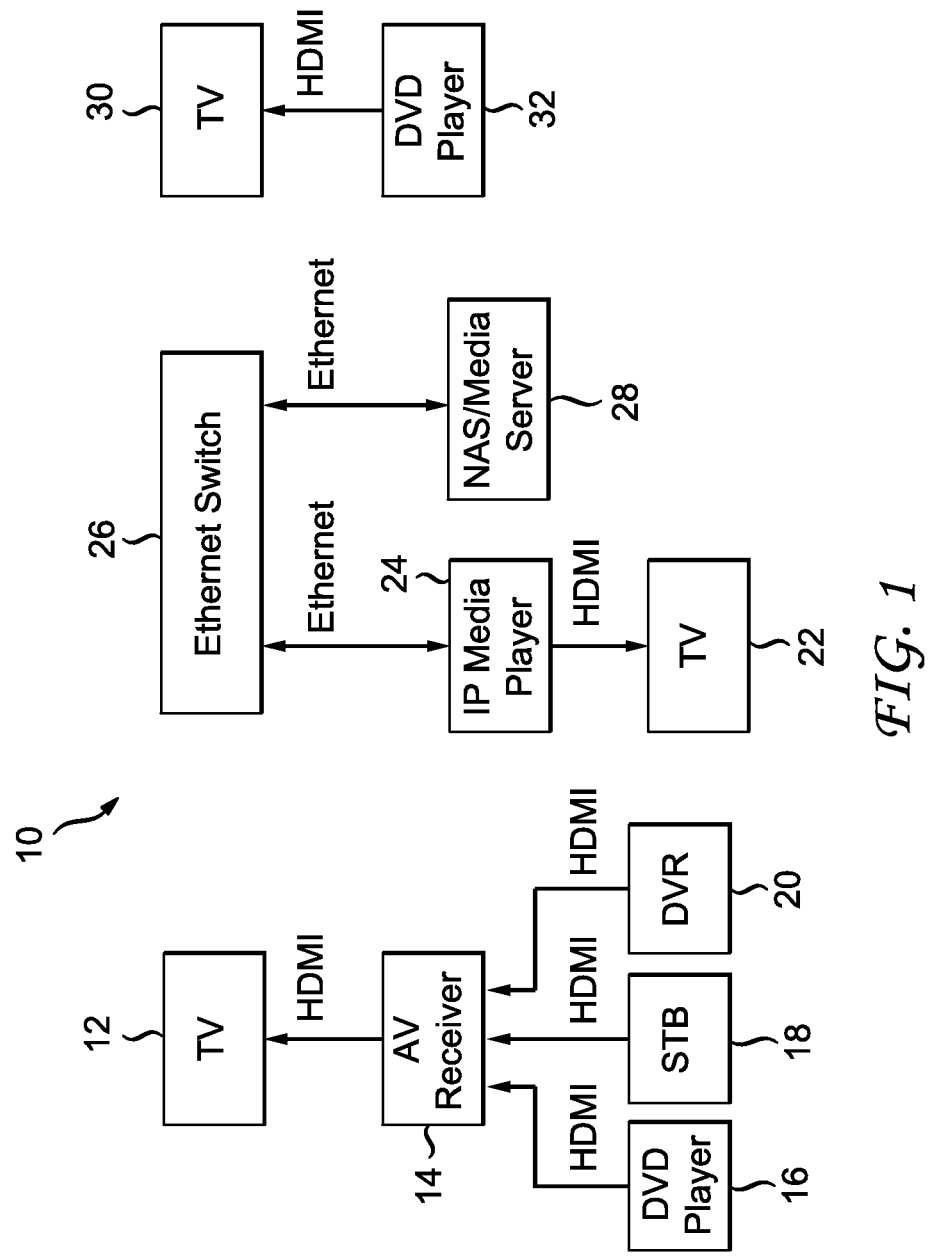
FIG. 1 is a block diagram of conventional scenario for home media connectivity.

It should be understood that the drawings are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A system and method for audio/video (AV) distribution between a range of devices over Internet Protocol (IP) networks are provided. The system and method described in this disclosure uses low latency encoding and IP networks to distribute content around the home. The present disclosure provides enhancements to the basic concepts already in practice to enable not only dedicated devices to transmit and receive AV signals, but new devices to have servers and clients integrated, have these servers and clients easily identified on the network, allow simple selection from a group of devices, and also allow existing standard devices such as set-top boxes (STBs) or televisions to be capable of receiving these signals.

The present disclosure is directed to an implementation of a Video Over IP (VOIP) solution that seamlessly supports transmission of high quality AV signals over IP, either from an analog output source such as Composite Video, S-Video, Component, or Video Graphics Array (VGA), a digital output source such as High-Definition Multimedia Interface (HDMI), Display Port or Digital Video Interface (DVI), or internally from within a device, extending it's video output to one or more remote devices in a number of ways.

As media devices emerge without being connect to display devices (such as Network-attached Storage (NAS) based Media Streamers or Residential Media Gateways), there is a need to extend a user experience from these devices to potentially multiple other devices connected on the network via Internet Protocol (IP). While HDMI provides excellent quality for directly connected devices, it carries very high bandwidth, uncompressed video, which cannot be transported via existing IP Networks. As will be described hereafter, the system does not preclude the use of other digital sources of content (such as Display Port or DVI), or other video servers on the IP network (such as a Digital Living Network Alliance (DLNA) Digital Media Server (DMS)), or analog video sources such as Composite, S-Video, Component, VGA, or other video connectors. In addition, in the case of the integration into an AV receiver, for example, there is no direct connection between the incoming interface and the server device, as the server's source of AV data will merely be the internal AV pipeline in the receiver.

In addition, all these interfaces and options may provide Input of raw audio/video from devices such as DVD players, set-top boxes, etc., in the case of a device classified as a "Server" (which takes A/V in and broadcasts it out on the network), or output of raw audio/video to a display in the case of a device defined as a "Client" (which take encoded AV streams of the network from other servers and renders the AV stream to a display device via a standard video interface such as those listed above). Certain devices, such as an AV receiver may also act as both a client and server at the same time, though dedicated client and server devices may also be provided.

Known mechanisms to compress and deliver audio/video information on IP networks today may be used to extend media delivery from numerous devices around the house via IP, and provide a capability to also receive this information from multiple devices around the home. The basic concept is that audio/video (AV) streams (such as via HDMI or a wide range of other interfaces listed above) are fed into a server device, which encodes the audio and video with a low latency encoder, putting the encoded audio and video into the IP network as an AV stream. This stream may then be subscribed to either by dedicated clients or standards based devices that access the data in a different way.

Dedicated devices will also be likely to include remote repeater mechanisms to extend the remote control mechanisms of the source device (via infrared (IR), Bluetooth or IP), via IP, allowing the source device to be controlled using its standard remote control at the location of the client device, and having the commands relayed from the client to the server via IP. The server then will have mechanisms to re-generate these signals in the original form to control the source device, so that it appears to that device as if it is being directly controlled by the remote. Additionally, the server device itself may be controllable directly and present its own user interface to multiple devices and be controlled by the same means.

The AV streams from servers may also be accessed, browsed and potentially controlled by standard Digital Living Network Alliance (DLNA) clients who will see the stream as a DLNA Digital Media Server (DMS) source. Other important data may also be signaled between dedicated servers and clients. This could, for example, include High-bandwidth Digital Content Protection (HDCP) handshaking for HDMI, which would be passed through IP in such a way as to make it appear that the device originating the content, such as a DVD player, would appear to be directly plugged into the end display device, such as a television connected to the client.

Figure 2:
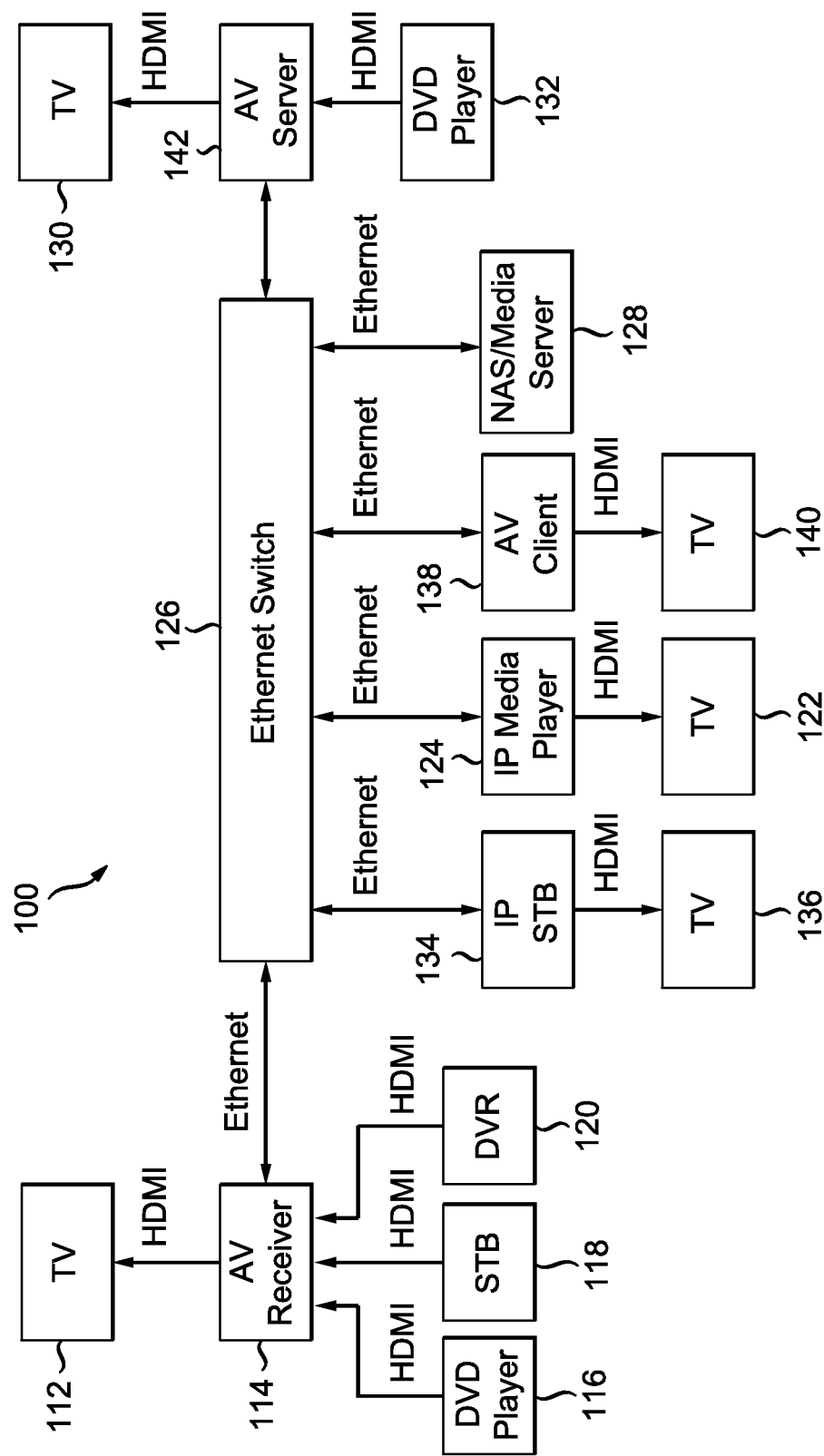
FIG. 2 is a block diagram of an exemplary scenario for home media connectivity in accordance with the present disclosure.

An exemplary connectivity system 100 in accordance with the teachings of the present disclosure is illustrated in FIG. 2. In the configuration shown in FIG. 2, all televisions or display devices 112, 122, 130, 136, 140 will have access to a plurality of content sources, e.g., DVD player 116, set-top box (STB) 118, DVR 120, IP media Player 124, NAS/Media Server 128, DVD player 132, IP STB 134, etc., in system 100. The functionality of being able to access the content sources throughout the system 100 is enabled by providing clients and servers coupling the display devices and content sources, respectively, to a network.

The components of system 100 of the present disclosure have several modes of operation (or rather stand-alone devices that may be provided and produced separately):

1. Client Only 138 (See FIGS. 3 and 4 for a simple client device, or FIG. 5 for a more complex example)
   A device that receives the media streams. This may be embodied as a small, stand alone device that plugs into a television or display device, or may take the form of a STB that is capable of decoding the streams, potentially in addition to other functions.

2. Server Only 142 (See FIG. 6 for a simple server device, or FIG. 7 for a more complex example)
   A device that takes a media input, i.e., an AV stream, and re-distributes it to clients or other devices capable of receiving the signal around the home. A server may also take the form of a device which is in itself a content source, providing its own user interface and remote control capabilities.

3. Client+Server 114 (Combines functions of the devices shown in FIGS. 3, 4 and 6)
   A device that can both send signals to clients and receive and decode signals from other devices such as AV receiver 114.

4. Digital Living Network Alliance (DLNA) Based Devices
   DLNA clients support mechanisms to discover available servers on a network. Each server device will appear as a DLNA DMS with whatever content streams are available. This would usually be just one stream from an HDMI port, for example, though may be multiple input streams in the case, for example, from an AV receiver.

5. Embedded Devices
   Each of the four options above embedded in a device (i.e. AV receiver 114 may have a client and server built in and various inputs and outputs could be directed to the server or clients as required).

In FIG. 2, the AV receiver 114 can act as a client, or a server, serving any selected input source. Similarly, the IP STB 134 and IP Media Player 124 in FIG. 2 could potentially operate as a client, or a server. If not specifically configured as directly supporting the mechanisms defined for IP distribution outlined in this document, both the IP STB 134 and IP Media Player 124 could still act as a form of client to the system utilizing standard communication mechanisms supported by the other servers operating in the home network, such as AV server 142 or the AV receiver 114, by joining to those devices as, for example, a DLNA client.

In FIG. 2, AV receiver 114 has three sources connected to it (DVD player 116, STB 118, and DVR 120). In one embodiment, the AV receiver may provide these inputs as multiple sources, or channels, as the case may be. In this instance, the channels would be automatically named according to the source on the receiver to which they are connected. In another embodiment, the system may be implemented more simply to have the receiver create a single "Channel" and have whichever source the user selects as an input to the receiver be defined as the source for that channel, in which case a more conventional channel naming scheme will apply.

Figure 5:
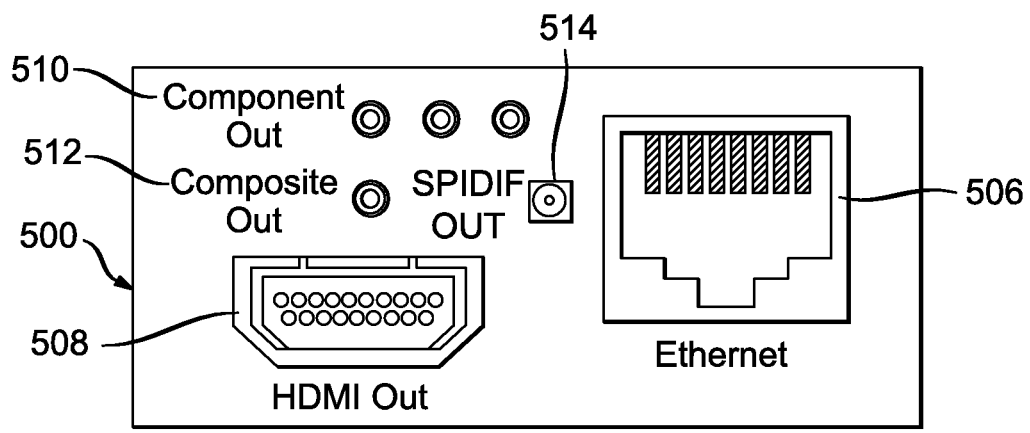
FIG. 5 is a view of an exemplary back panel of a more complex audio-video (AV) client only device in accordance with the present disclosure.
Figure 7:
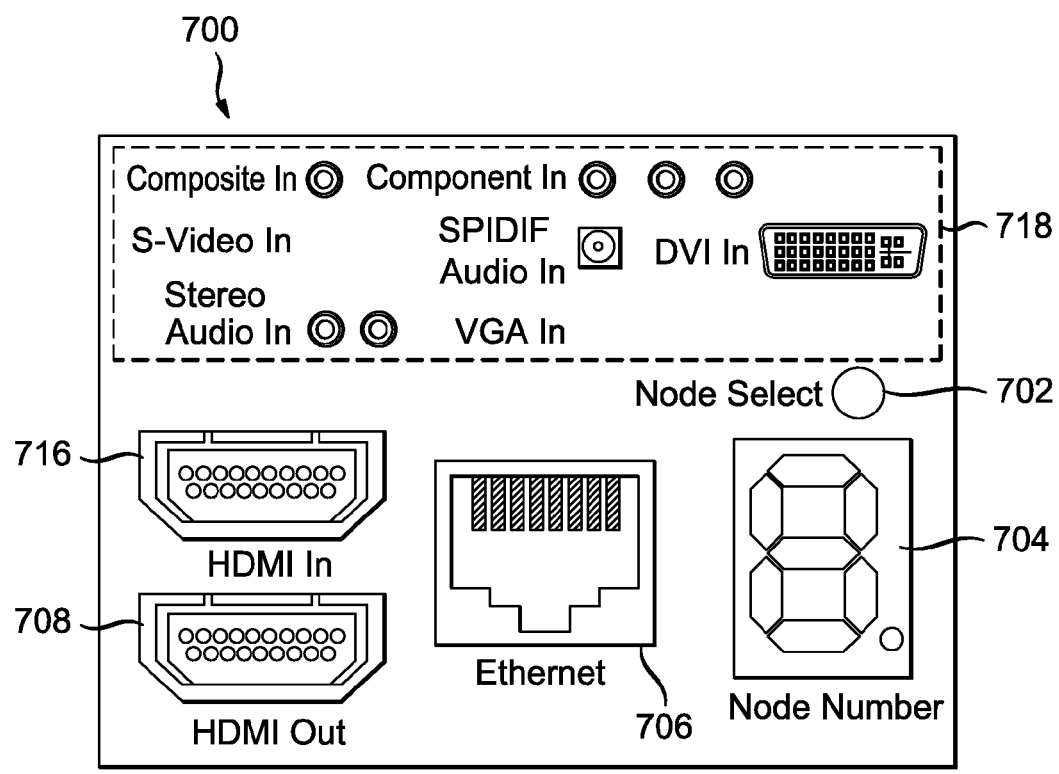
FIG. 7 is a view of an exemplary back panel of a more complex audio-video (AV) server only device in accordance with the present disclosure.

Although HDMI is primarily used as example for the AV stream, the teachings of the present disclosure applies equally to all forms of AV, i.e., instantiations of clients and servers may also include Composite, S-Video, Component, VGA, DVI or other video connectors for both input and output of AV, and audio may also be treated separately and include standard analog audio connectors, Sony/Philips Digital Interface (SPDIF), etc. (as shown in FIGS. 5 and 7). In any case, the audio/video data is taken in to the server via some form of input and encoded.

The key features that differentiate system and method of the present disclosure relate to the dynamic configuration and channel selection mechanisms to support multiple server devices on a single network, providing a bridge to standard DLNA devices through a DMS to allow DLNA clients to connect to server nodes as standard streams, and mechanisms to bridge AV streams through a media gateway to non-standard devices, e.g., non-DLNA device, or to other devices outside the home network. Furthermore, the system operates under a mesh management mechanism described hereafter.

Figure 8:
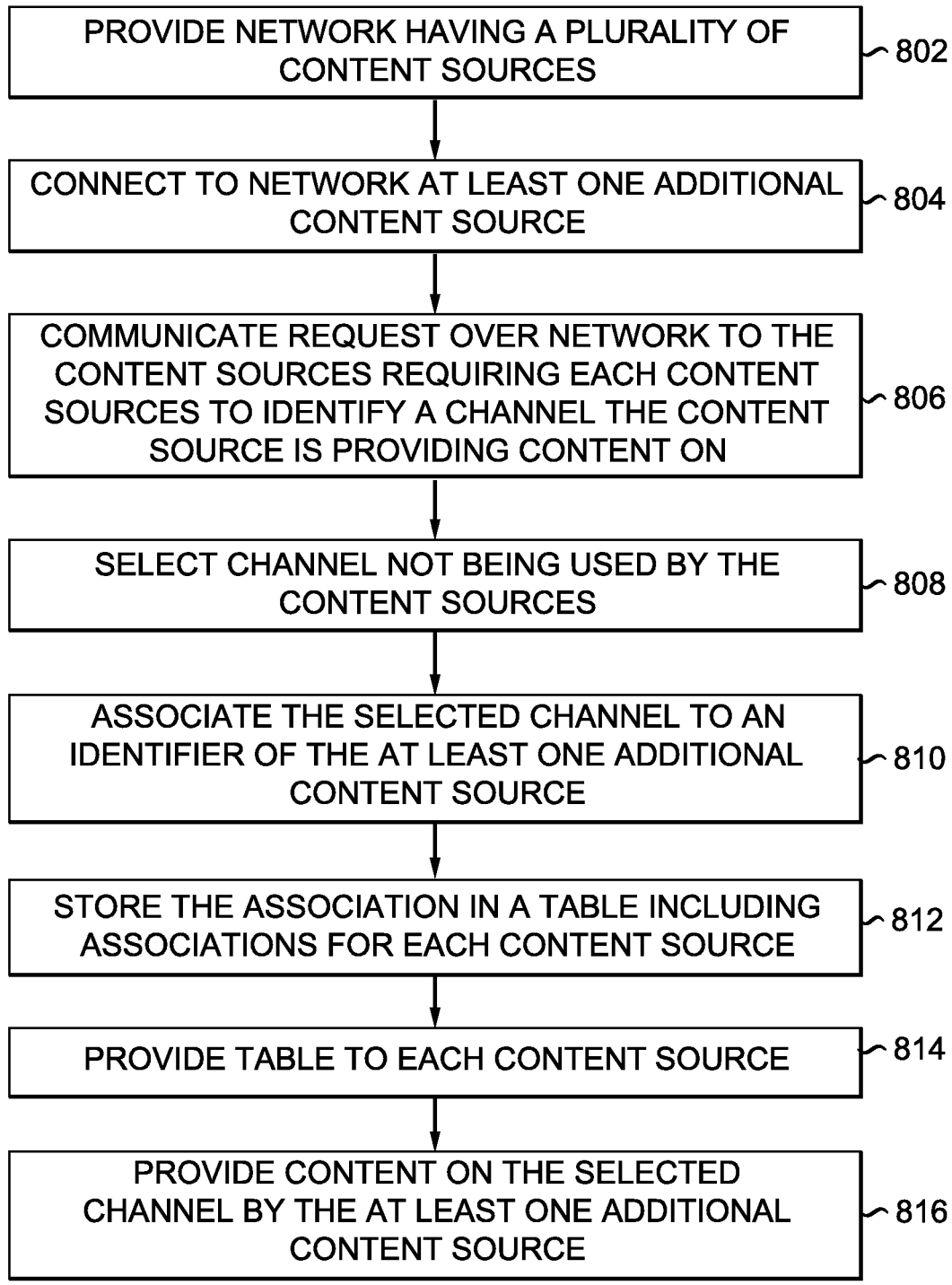
FIG. 8 is a flowchart illustrating an exemplary method for providing content on a network having a plurality of content sources in accordance with the present disclosure.
Figure 9:
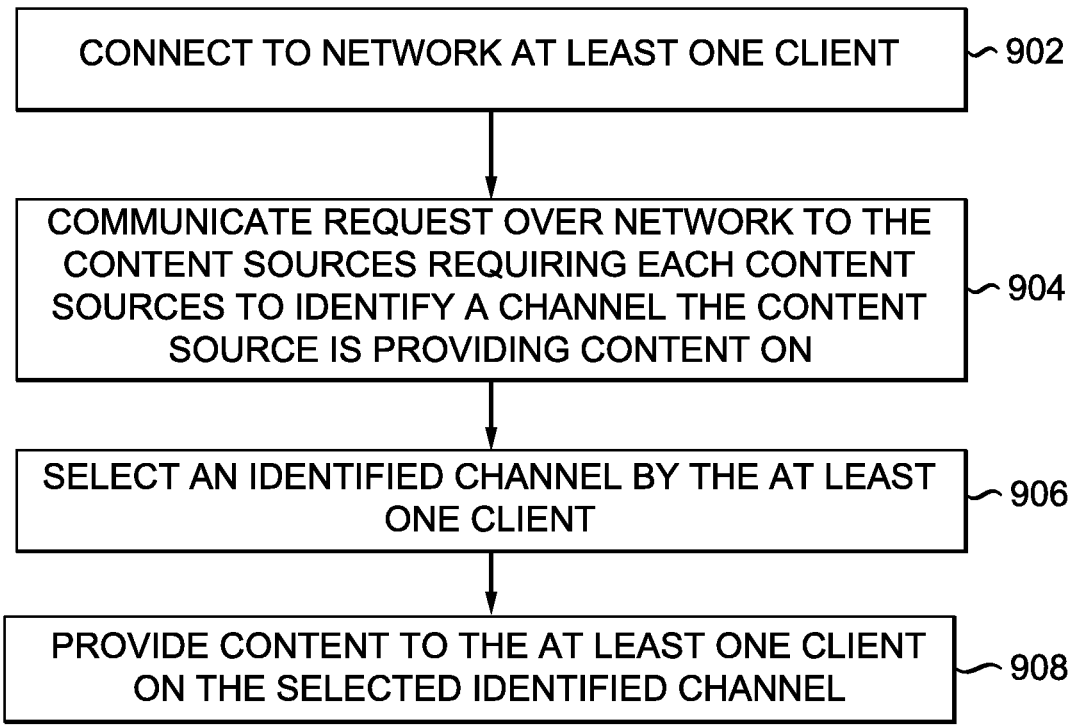
FIG. 9 is a flowchart illustrating an exemplary method for receiving content by a client on a network having a plurality of content sources in accordance with the present disclosure.

A method for providing content on a network having a plurality of content sources will be described below in relation to FIG. 8 and a method of playing or receiving the content will be described in relation to FIG. 9.

Initially, in step 802, a network is provided having a plurality of content sources e.g., DVD player 116, set-top box (STB) 118, DVR 120, IP media Player 124, NAS/Media Server 128, DVD player 132, IP STB 134, etc. The system 100 operates in a fashion whereby any additional server device plugged into or connected to the network will determine a "Channel" on which to communicate, step 804. The "Channel" is a number to simply identify the content source for easy selection on a client device or display. After at least one additional content source is connected to the network, the at least one additional content source will communicate a first request over the network to the content sources, the request requiring each of the plurality of content sources to identify channels on which each of the plurality of content sources provides content, step 806. This is achieved by broadcasting a request for other connected servers to respond and assuming a free channel is one channel higher than the highest respondent. In the event that the previous highest channel device is off, the user may need to intervene to manually change either the previous or newest server's channel; alternatively, this renumbering will occur automatically.

Devices will announce their connection via UPnP, and this will allow discovery of other devices in the network. Using multicast, all devices on the LAN will receive the announcement, which will occur as soon as the device has obtained an IP address. This means all other devices will know that a new device has been added, and the IP address via which to address it. When a server is plugged in or connected to the network, the server, e.g., AV server 142, will announce its existence and configuration. If no other servers respond within a short period (e.g., 1 second), the newly added server will assume a default Channel of 1, and broadcast this information as well. Any clients connected to the network will also be configured to access this by default, and any servers that exist already will respond to announcement with point to point messages to the new server indicating their existing "Channel", so that the new device can re-configure itself to be a higher channel than the ones already existing.

In step 808, the at least one additional content source, e.g., server 142, will select a channel not being used by the plurality of content sources to provide content on. The selected channel will be associated to an identifier of the at least one additional content source, step 810, and the association will be stored in a table including associations for each of the plurality of content sources, step 812. It is to be appreciated that the identifier is a mechanism to identify the hardware generating the channel and may be a media access control (MAC) or Internet Protocol (IP) address of the at least one additional content source. Additionally, the identifier will have at least one associated Uniform Resource Identifier (URI) for identifying the content source on that hardware. In certain embodiments, each content source may present multiple URIs for different protocols or versions of the same stream, e.g., http:// . . . Or rtsp:// . . . and perhaps even modifiers to allow lower resolution streams, etc. such as rtsp://filename.mp4/?resolution=640×480. In step 814, the table is provided to each content source. At least one additional content source may then provide content on the selected channel, step 816. Additional metadata may also be associated with each device including a "type", for example, to identify if it provides a user interface and/can be controlled directly and if so how.

When a client is connected to the network (or turned on from a stand-by state), step 902, the client will broadcast a request or message asking for existing servers to respond, step 904, the request requiring each of the plurality of content sources, i.e., servers, to identify channels on which each of the plurality of content sources provides content. Servers seeing this message will respond with their existing channels. In step 906, the client will select an identified channel and the content source associated to the selected channel will provide content to the client, step 908. Note that devices may also go into a standby state automatically and be woken automatically from that standby state with known "Wake on LAN" mechanisms.

Figure 3:
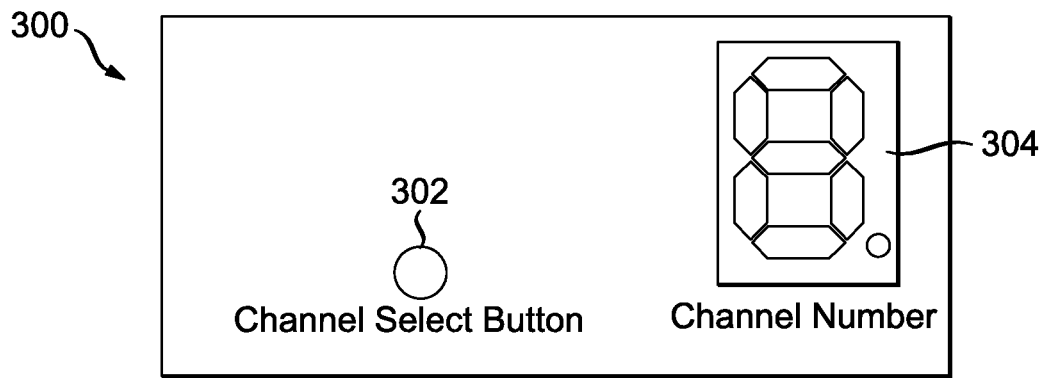
FIG. 3 is a view of an exemplary front panel of a simple audio-video (AV) client only device in accordance with the present disclosure.
Figure 4:
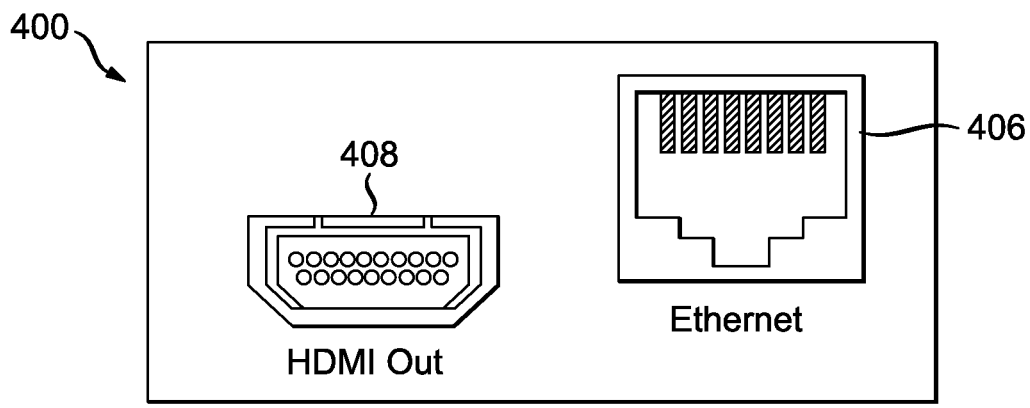
FIG. 4 is a view of an exemplary back panel of a simple audio-video (AV) client only device in accordance with the present disclosure.
Figure 6:
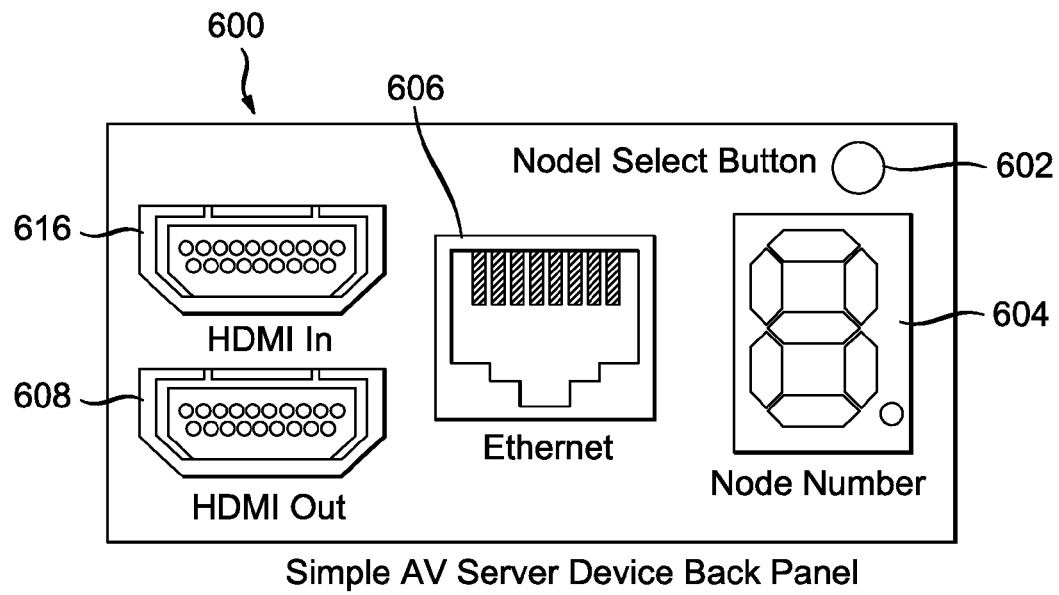
FIG. 6 is a view of an exemplary back panel of a simple audio-video (AV) server only device in accordance with the present disclosure.

As part of the configuration process, each device may be given a name and/or location to make the device easier to identify. However, for the sake of simplicity, the channels may be represented by numbers on seven-segment displays on both the server and client. For example, FIG. 3 illustrates an exemplary front panel 300 of a client device, which includes a channel select button 302 and a single seven-segment channel number display 304 for displaying the selected channel. As a further example, FIGS. 6 and 7 illustrate a back panel of a server device 600, 700 includes a seven-segment node number display 604, 702, respectively. In these examples, the "Channel" of any given server will be set automatically, though may altered simply by pressing a Node Select Button 602, 702 until the desired channel is reached, or done through a management user interface on the device. For client devices, the button 304 allows easy selection between available channels.

It is to be appreciated that the back panel of the clients (FIGS. 4 and 5) and servers (FIGS. 6 and 7) will further include appropriate connections for receiving and/or outputting the AV streams. For example, the clients will include a mechanism for coupling the client 400, 500 to a network, e.g., an IP network. This may take the form of one or more of an Ethernet port 406, 506, wireless connection such as 802.11n, or other networking technology such as Multimedia over Coax Alliance (MoCA), Home Phoneline Networking Alliance (HPNA), G.HN as developed under the International Telecommunication Union (ITU-T), Homeplug AV etc. Additionally, the clients 400, 500 will include output connections for outputting the AV streams to a display device such as a television. Exemplary output connections may include Component Out connectors 510, Composite Out connectors 512 and a SPIDIF connector 514. Furthermore, the servers will include a mechanism for coupling the servers 600, 700 to the network. As with clients, this may take the form of one or more of an Ethernet port 606, 706, wireless connection such as 802.11n, or other networking technology such as MoCA, HPNA, G.HN, Homeplug AV etc. The servers 600, 700 will further include appropriate input connections for receiving AV input streams (e.g., HDMI in 616, 716 and other standard connections 718 such as Composite In, S-Video In, Stereo Audio In, Component In, SPIDIF Audio In, VGA IN, DVI In, etc.) and output connections for outputting the AV streams to a display device such as a television (e.g., HDMI Out 608, 708).

Devices will be managed in a mesh configuration such that any changes that are made on any devices may be propagated to all other devices in the network—i.e. any device could be considered the master device. There may be any arbitrary number of channels provided on the network, though the system becomes less practical as the number of channel rises. For a simple instantiation, 10 "Channels" (with channels 0 through 9) could be supported using a single seven-segment display as illustrated on FIGS. 3 and 6. The channel selected will be mapped in the table to each device so that all client and server devices will have the table, mapping device ID (based on MAC address and/or IP address, URI and metadata) to the Channel.

Because each device (be it server or client) announces itself when connected, all devices in an operational state, and devices receiving this notification respond directly, each device will have an up to date status of all compliant devices connected to the network. Each of these devices will have default behavior from the factory with a pre-defined private multicast address for broadcast content (if required), that is incremented by 1 for every channel number. The device will broadcast (multicast) with an IP address relative to the channel identification, and this will be known. When multicasting content, given appropriate content permissions, the stream may also be decoded by a standard video client such as the VideoLAN client (VLC) application. Multicast will only be used when it saves bandwidth, such as in the event that multiple clients are accessing the same content.

Devices may be configured via an in-built web server. When a user goes to the web page to manage the device, all devices in the network may be displayed, with their parameters editable (such as name/location). Some parameters may be modified on one device only, but apply to all other devices in the network, such as changing any server's multicast address, which may change just the selected server, or this may result in changes that are automatically applied to all other devices, for example, to keep the basic rule of the multicast address for broadcast always being a fixed base value plus the channel number on which the server resides. When managing one device, the status of all other devices should already be known due to the broadcast chatter each device engages in during the initial turn-on discovery phase. However, the device being managed may also poll all known devices as required to validate their current configuration and status.

Independent of the configuration mechanisms and server setup, the client devices will provide extremely simple mechanisms for selecting the server channel, both manually via the device, and dynamically through the display device, e.g., a television. FIG. 3 shows an example of a channel selection button 302 on the front of a simple client device 300. Pressing the button will cycle through available channels, with the overlay of the channel number being displayed on both the display 304 on the client device and a display device, e.g., a television, coupled to the client device. Only available channels will be displayed upon using this button. The "Channel Number" is mapped to a defined video stream URI that has been previously broadcast between devices for the selected server. Stopping on a particular "Channel" number will cause the client device to join that video stream and display it on a coupled display device.

The user may also be able to cycle through available channels either with a remote control for the client or the button 302 on the device itself. This could be implemented as a channel up/down button, or rather simply cycle through the available channels. Stopping on a channel for a short period will select the stream for that channel and consequently the television or display device will display the content for the selected channel with an overlay of the channel number over the top of it (generated by the client device). Once the user sees the channel they would like to select, they can press an acknowledgement button on the remote or on the device itself to select that channel, or simply not press another button to remain on the selected channel.

Figure 10:
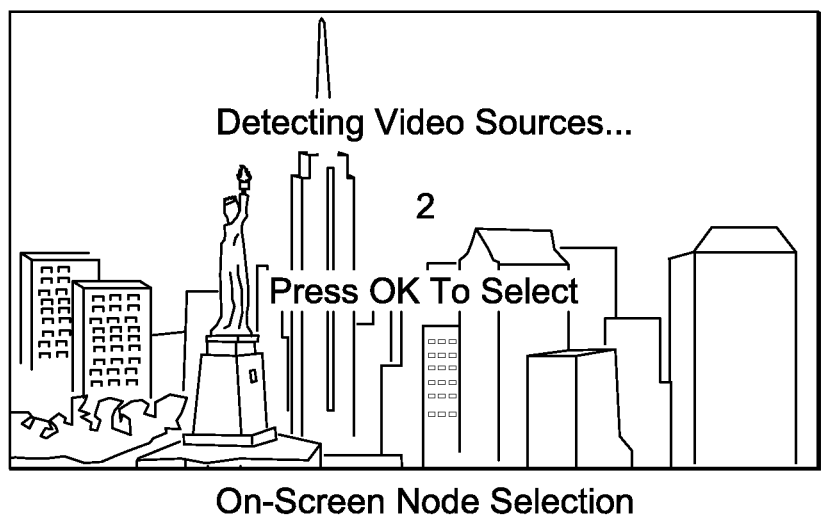
FIG. 10 illustrates an exemplary on-screen node or channel selection in accordance with the present disclosure.

In another embodiment, the system could be put into scan mode where it will automatically scan through available channels, displaying each for a short period on the television or display device. In this embodiment, the user would simply press "Ok" on a remote or the device when the right channel appears. Note, that in this embodiment, any configured details such as the name and location of the device will also be displayed on the display device. When in the channel discovery mode, channels will be cycled through one at a time, each being displayed for a few seconds (See FIG. 10 for an example). Given that each device will know what other devices are available, only available channels will be displayed in either the on-device or TV based selection modes. In addition to a seven segment display, some devices may have much more detailed displays that are also capable of displaying the information regarding the selected server too.

The system will also dynamically support a unicast or multicast mode so that if multiple clients are attempting to watch the same source, i.e., at least two clients, the server can switch to multicast mode, effectively broadcasting the channel, and notifying the clients of the new Uniform Resource Identifier (URI) for the Channel. When the number of clients subscribing to the channel drops to 1, the system will be able to revert to unicast mode, simply sending the data to a single client. While typically a unicast channel may have a URI such as "udp://192.168.1.3/lounge.ts", in the case of a multicast stream, this will most likely be an Real-time Transport Protocol (RTP) encapsulated stream with a multicast address and be based on Real Time Streaming Protocol (RTSP), for example "rtsp://225.1.1.1/lounge.ts".

There are many other features that would likely be provided in addition to the number of other features variously described in this disclosure. Each device will know when devices are connected and which streams are being received by which devices (either through queries in multicast, or the fact that they are being requested media streams directly). In the event that no clients are connected, the server device simply operates as a general video or specifically an HDMI extender and/or up-scaler to improve quality, i.e., no Ethernet bandwidth used by encoding and transmitting audio or video unnecessarily. When a client subscribes, the encoder is turned on, and the device will generate a video stream on the network.

The system of the present disclosure will also provide mechanisms to vary the output data rate, resolution and potentially video and audio codecs (such as MPEG-2, H.264 & VC1), encapsulations (such as Transport Streams or MP4 containers) and protocols (such as RTSP/RTP, raw UDP, HTTP), etc. to support lower (or higher) quality network connections, and specific devices. This capability may be extended to support multiple simultaneous different streams from the same server, and an individual device may also support multiple "Channels" of input and output simultaneously. Input devices (e.g., servers) will have an inbuilt scaler and video processor to allow optimal quality of video being sent to the encoder. Output devices (e.g., clients) will also have an inbuilt video scaler to allow them to support multiple optimal output resolutions.

In another embodiment, the system will support Digital Living Network Alliance (DLNA) compliant devices. The DLNA provides standard mechanisms for devices to share content directories with other client devices. Typically, this relates to media files on a disk that can be browsed and selected for playback. Another attribute of a DLNA based server is that they also announce themselves on the network. An attribute of the server device described in the present disclosure is that in addition to the proprietary video sharing technologies described, the server will also appear on the network as a DLNA Media Server (DMS). As such, any DLNA player device (e.g., Player Renderer or Control Point) will be able to see the server as a DLNA DMS server. The server will be named according to the defined server name, location and/or channel number of the server device. From a DLNA client perspective, the server will typically appear to have a single file in the video section, and selecting this virtual file with a standard DLNA client will cause the content from that server to be served as a DLNA compliant Video/Audio or Audio only stream. While the server device does not actually have a file, it will package the live data to the client in exactly the same way as it would if it was delivering a file off a disk.

The server devices may also have an amount of local storage, in the form of hard disk or Flash based storage, allowing live data to be compressed then effectively written as a looped file to disk (as may be done with a typical "Pause Buffer" on other similar conventional systems). In this way, the system will be able to support "trick mode" functions on the viewed content, allowing the user to pause, rewind and fast-forward through the content. An additional function may be provided either by a separate device or as a server that is configured as a master that provides an amalgamated display of all other servers on the network. In this instance, the server may appear as a DLNA server with a more generic name such as "Master Video Distribution Device" and the channels for each of the other servers will essentially appear as if it were a file in the list of video assets available under that main server.

Note that at present, only MPEG-2 support is required for DLNA certification, though many additional codecs such as H.264 may be supported in various DLNA client implementations. Therefore, the server device may require the generation of multiple codecs in order to provide the best possible combination of support and compression technology to optimize the quality of viewing experience over potentially bandwidth constrained links in the home. The devices will also support Reliable Transport Protocol (RTP) encapsulation, RTSP, and RTSP based error recovery mechanisms in addition to raw video over User Datagram Protocol (UDP) and Hypertext Transfer Protocol (HTTP) delivery for maximum compatibility with a range of other client devices outside the ecosystem of the client devices operating with the capabilities and mechanisms defined in the present disclosure.

Figure 11:
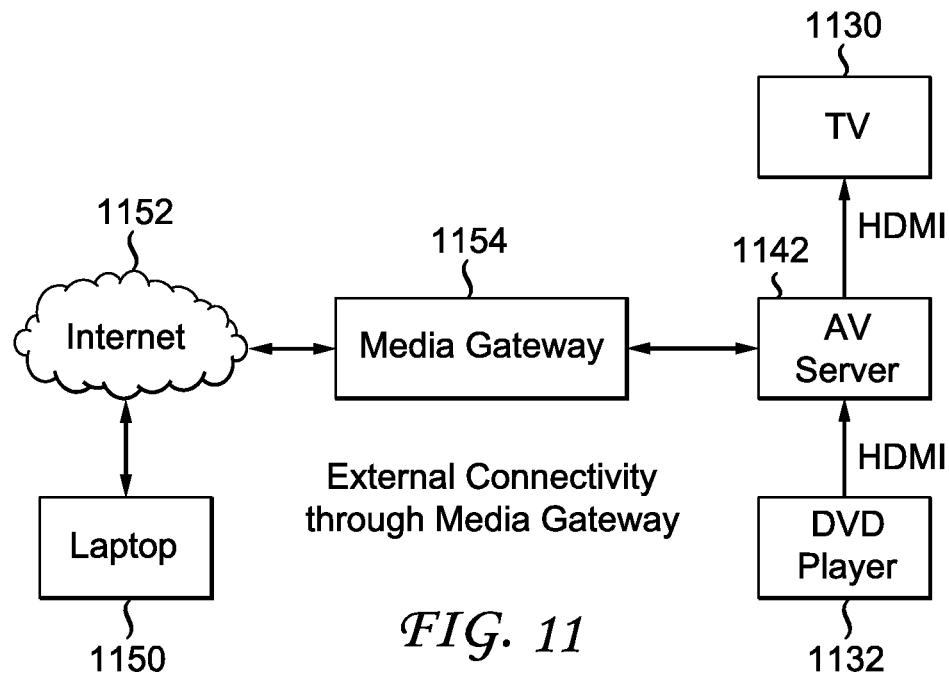
FIG. 11 is a block diagram of an exemplary scenario for external connectivity through a media gateway in accordance with the present disclosure.

The system and method of the present disclosure will allow multiple instances of both clients and servers to exist in the network at once, as well as possibly extending the functionality to allow streaming this data outside the home, giving the user visibility of the devices that exist within the home, and allowing selection of the server device to stream video to a remote location through a media gateway. In this embodiment, a remote device outside the home network, such as a PC computer with a web browser, will be provided with a list of available, active sources (i.e., servers) within the home, a mechanism for selecting them, and a capacity to configure the server to provide an appropriate stream. This is illustrated in FIG. 11, where a laptop computer 1150 accesses the home network via a second network 1152, e.g., the Internet, the home network and second external network being coupled by a media gateway 1154. In this embodiment, the media gateway 1154 will enable the remote client 1150 to access at least server 1142 and other servers on the network.

Figure 12:
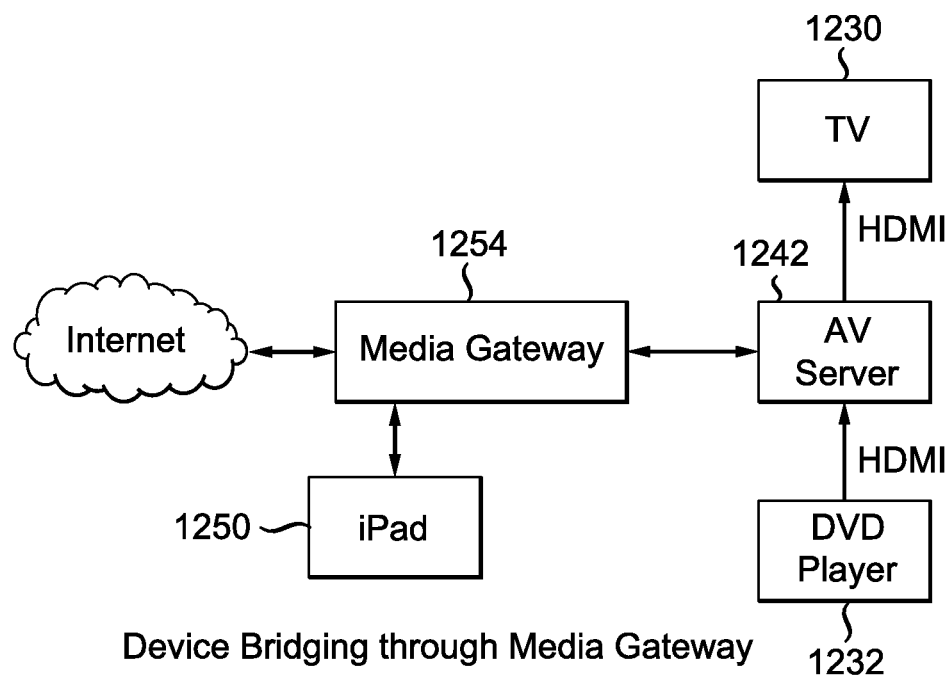
FIG. 12 is a block diagram of an exemplary scenario for device bridging through a media gateway in accordance with the present disclosure.

In one embodiment, a server may be accessed directly from outside the home network. This is only achievable with special configuration of the user's gateway to allow traffic through, or with the server in the gateway itself. In another embodiment, this may be achieved through an intermediate device with a dedicated function of taking the output from a server, and re-processing it into a format and data rate that is required by the remote client. This same functionality will also exist within the home to, for example, allow non-standard devices (for example, a non-DLNA compliant device such as an iPad™ commercially available from Apple™ of Cupertino, Calif.), to stream content from a particular server, bridging standard and proprietary content delivery domains. This is illustrated in FIG. 12, where the non-DLNA device 1250 will access server 1242 via media gateway 1254. In this case, the functionality would also logically reside in the user's gateway 1254.

Although embodiments which incorporate the teachings of the present disclosure have been shown and described in detail herein, those skilled in the art can readily devise many other varied embodiments that still incorporate these teachings. Having described preferred embodiments of a system and method for video distribution over IP networks (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for providing content on an Internet Protocol (IP) network, the method comprising:
   establishing a connection to the network as a content source;
   communicating, from the content source, a first request over the network to any other content sources, the request requiring each of the any other content sources to send a response to the request directly to the content source identifying channels on which each of the any other content sources provides content;
   selecting, by the content source, a channel not being used by the any other content sources based on the responses to the first request, wherein when no responses to the first request are received by the content source within a period of time, selecting a default channel, and when the responses to the first request are received by the content source within the period of time, selecting, by the content source, a channel that is one channel greater than the highest identified channel in the responses to the first request;
   providing content to at least one client on the selected channel from the content source; and
   communicating, from the content source, any channel change from the selected channel to each of the any other content sources on the network.

2. The method as in claim 1, further comprising:
   connecting the at least one client to the network;
   communicating a second request over the network to the any other content sources and the content source, the second request requiring each of the any other content sources and the content source to identify channels on which each of the any other content sources and the content source provides content;
selecting an identified channel by the at least one client; and
providing content to the at least one client on the selected identified channel.

3. The method as in claim 1, further comprising:
associating each used channel to an identifier of the content source using the channel; and
storing the associations in a table of available content sources.

4. The method as in claim 3, wherein the identifier is a media access control (MAC) address with an associated Uniform Resource Identifier (URI) that defines the mechanisms by which content on the content source may be accessed.

5. The method as in claim 3, wherein the identifier is an Internet Protocol (IP) address with an associated Uniform Resource Identifier (URI) that defines the mechanisms by which content on the content source may be accessed.

6. The method as in claim 3, further comprising providing the table of available content sources to each of the any other content sources, the content source, and to the at least one client device connected to the network.

7. The method as in claim 3, further comprising providing the table of available content sources to the at least one client connected to the network.

8. The method as in claim 2, wherein the providing the content includes:
receiving a raw audio-video stream from an external source;
encoding the audio-video stream with a low latency encoder; and
providing the encoded audio-video stream on the selected channel.

9. The method as in claim 2, wherein if the number of clients selecting the identified channel is greater than or equal to two, further comprising:
multicasting the content on a second channel not being used by the any other content sources or the content source; and
notifying the clients of the content on the second channel.

10. The method as in claim 2, wherein the selecting the identified channel includes manually selecting the identified channel via a mechanism on the at least one client.

11. The method as in claim 2, wherein the selecting the identified channel includes:
displaying the identified channel on a display device coupled to the at least one client; and
selecting a displayed identified channel.

12. The method as in claim 2, wherein the selecting the identified channel includes:
displaying the identified channel on a display device coupled to the content source; and
selecting a displayed identified channel.

13. The method as in claim 12, wherein the display device is integrated into the content source.

14. The method as in claim 11, wherein the displayed identified channels are cycled through by a user.

15. The method as in claim 2, wherein the selecting the identified channel step includes:
scanning through available identified channels;
displaying each available identified channel on a display device coupled to the at least one client in a cyclic manner; and
selecting a displayed identified channel.

16. The method as in claim 15, wherein a name and location of the content source is displayed with each identified channel.

17. The method as in claim 2, wherein the at least one client is a Digital Living Network Alliance (DLNA) player device.

18. The method as in claim 17, wherein the additional content source is a server, further comprising:
packaging the provided content in such a way as to appear as a file to the DLNA player device; and
serving the packaged file to the DLNA player device.

19. The method as in claim 18, further comprising:
presenting each channel being used by the any other content sources and the content source as a set of files to the DLNA player device.

20. The method as in claim 2, further comprising:
presenting a list of the any other content sources and the content source to a remote client via a gateway; and
upon selection of one of the any other content sources or the content source, streaming content from the selected content source to the remote client.

21. The method as in claim 20, wherein the streaming further comprises processing the content into a format and data rate required by the remote client.

22. The method as in claim 21, wherein the remote client accesses the network via a second network.

23. An apparatus for providing content on an Internet Protocol (IP) network, the apparatus comprising:
a network interface that connects the apparatus to any other content sources through the network; and
a processor configured to:
communicate a first request over the network to each of the any other content source, the request requiring each of the any other content source to send a response to the first request directly to the apparatus identifying channels on which each of the any other content sources provides content,
select a channel not being used by the any other content sources based on the responses to the first request to provide content to the network from the apparatus, wherein when no responses to the first request are received by the content source within a period of time, the processor selects a default channel, and if the responses to the first request are received by the content source within the period of time, the processor selects a channel that is one channel greater than the highest identified channel in the responses to the first request,
provide content to at least one client on at least one of the selected channel from the apparatus,
receive any channel change from identified channels of a content source directly from each of the any other content source on the network, and
communicate any channel change of the apparatus directly to each of the any other content source on the network.

24. The apparatus as in claim 23, wherein the apparatus receives a second request over the network, the second request requiring identification of channels on which content is provided and wherein, upon selecting an identified channel by the at least one client connected to the network, content is provided to the at least one client on the selected identified channel.

25. The apparatus as in claim 23, wherein the processor is further configured to associate each used channel to an identifier of the content source using the channel and store the associations in a table of all available content sources.

26. The apparatus as in claim 25, wherein the identifier is a media access control (MAC) address with an associated Uniform Resource Identifier (URI) that defines the mechanisms by which content on the content source device may be accessed.

27. The apparatus as in claim 25, wherein the identifier is an Internet Protocol (IP) address with an associated Uniform Resource Identifier (URI) that defines the mechanisms by which content on the content source device may be accessed.

28. The apparatus as in claim 25, wherein a server provides the table of available content sources to each of the any other content sources, the apparatus, and the at least one client device connected to the network.

29. The apparatus as in claim 25, wherein the processor is further configured to provide the table of available content sources to the at least one client connected to the network.

30. The apparatus as in claim 23, wherein the processor is further configured to receive an audio-video stream from a content source, encode the audio-video stream with a low latency encoder and provide the encoded audio-video stream on the selected channel.

31. The apparatus as in claim 24, wherein if the number of clients selecting the identified channel is greater than or equal to two, the processor being configured to multicast the content on a second channel not being used by the any other content sources and the apparatus and notify the clients of the content on the second channel.

32. The apparatus as in claim 24, wherein the apparatus includes a selecting mechanism disposed on the at least one client for manually selecting the identified channel.

33. The apparatus as in claim 24, wherein the apparatus is coupled to a display device that displays the identified channels.

34. The apparatus as in claim 33, wherein a name and location of the content source is displayed with each identified channel.

35. The apparatus as in claim 33, wherein the displayed identified channels are cycled through by a user.

36. The apparatus as in claim 24, wherein the apparatus is coupled to the at least one client that scans through available identified channels and displays each available identified channel on a display device coupled to the at least one client in a cyclic manner.

37. The apparatus as in claim 36, wherein a name and location of the content source is displayed with each identified channel.

38. The apparatus as in claim 24, wherein the at least one client is a Digital Living Network Alliance (DLNA) player device.

39. The apparatus as in claim 23, wherein the processor is further configured to package the provided content in such a way as to appear as a file to a DLNA player device and serve the packaged file to the DLNA player device.

40. The apparatus as in claim 39, wherein the channels being used by the any other content sources and the apparatus are presented as a set of files to the DLNA player device.

* * * * *